United States Patent [19]

Mumford

[11] Patent Number: 5,237,812
[45] Date of Patent: Aug. 24, 1993

[54] AUTO-IGNITION SYSTEM FOR PREMIXED GAS TURBINE COMBUSTORS

[75] Inventor: Stephen E. Mumford, Longwood, Fla.

[73] Assignee: Westinghouse Electric Corp., Pittsburgh, Pa.

[21] Appl. No.: 957,123

[22] Filed: Oct. 7, 1992

[51] Int. Cl.$^5$ ............................................. F02C 3/20
[52] U.S. Cl. ............................... 60/39.06; 60/39.463; 60/737; 60/746
[58] Field of Search .................. 60/39.06, 39.463, 737, 60/738, 746, 747, 39.826

[56] References Cited

U.S. PATENT DOCUMENTS

| | | | |
|---|---|---|---|
| 3,958,416 | 5/1976 | Hammond et al. | 60/737 |
| 4,253,301 | 3/1981 | Vogt | 60/39.463 |
| 4,292,801 | 10/1981 | Wilkes et al. | 60/39.06 |
| 4,420,929 | 12/1983 | Jorgensen et al. | 60/737 |
| 4,701,124 | 10/1987 | Maghon et al. | 60/746 |
| 5,054,280 | 10/1991 | Ishibashi et al. | 60/39.06 |
| 5,069,029 | 12/1991 | Kuroda et al. | 60/737 |

Primary Examiner—Louis J. Casaregola

[57] ABSTRACT

A method and system for auto-igniting the pilot section of a gas turbine combustor prior to down-loading the turbine from base load operation. A liquid fuel is employed that has an auto-ignition temperature which is less than the temperature of air which enters into the recirculation zone of the pilot section. The liquid fuel is injected into the recirculation zone and auto-ignites, causing natural gas fuel which is also being injected into the pilot section to burst into flame, creating a diffusion flame in the pilot section. This permits operation of the pilot section in a premix mode where natural gas fuel mixes with air without a flame during base load operation, thus providing for low production of NOx emissions, while ensuring maintenance of a flame in the combustor when the flame in the main burn section of the combustor is extinguished to allow for turbine unloading.

11 Claims, 4 Drawing Sheets

AUTO-IGNITION SYSTEM FOR PREMIXED GAS TURBINE COMBUSTORS

FIELD OF THE INVENTION

This invention relates generally to gas turbines, and more particularly to systems and methods for igniting the pilot section of a combustor, following operation of the pilot section in a premix mode where natural gas fuel mixes with air without combustion.

BACKGROUND OF THE INVENTION

Many gas turbine power plants comprise a number of combustors, wherein each combustor has multiple burning zones, such as a pilot section and a main burn section, which is adjacent to and downstream of the pilot section. For example, gas turbines of the W 501D5 type, manufactured by Westinghouse Electric Corporation, employ 14 combustors axially mounted about the longitudinal axis of the gas turbine, each combustor comprising a pilot section and a main burn section.

Regarding the W 501D5 gas turbine, during turbine start-up conditions, natural gas fuel is injected separately into both the pilot section and main burn section of each combustor. Electrical igniters are provided in the pilot section of two of the fourteen combustors. When these electrical igniters are fired, a flame is created in the pilot section, as the gas injected into that pilot section mixes with the surrounding air and burns. This flame is referred to as a diffusion flame since mixing of the fuel with the air occurs via a diffusion process. Hot combustion products from the lit pilot section flow into the associated main burn section, causing the natural gas fuel injected into that section to combust and burn.

In order to create a diffusion flame in the pilot sections of the remaining non-lit combustors, cross flame tubes are provided which connect the pilot sections of two adjacent combustors. As a result of the combustion process taking place in the pilot sections of the two electrically lit combustors, the pressure in these pilot sections increases above the pressure level in the pilot section of the neighboring, non-lit combustor. This pressure differential forces hot combustion gases to flow through the cross flame tubes and into the pilot section of the neighboring combustor. As these hot gases enter the pilot section of the neighboring combustor, the natural gas ignites and creates a diffusion flame in the pilot section. Accordingly, hot gas from that pilot section flows downstream into the adjacent main burn section, igniting the natural gas fuel which is injected into that main burn section. This procedure continues until all neighboring combustors are lit. At this point, the pilot sections are said to operate in a diffusion burn mode and the main burn sections operate in a lean burn mode.

Some time after turbine start-up, after all of the combustors have been lit, the turbine reaches base load operating conditions. At this point it is undesirable to maintain operation of the combustors with the pilot section in the diffusion burn mode, as undesirable levels of nitrogen oxide emissions are known to be produced during this type of operation. High levels of NOx emissions are produced when the pilot section operates in the diffusion burn mode since the injected natural gas fuel burns at a relatively high temperature.

Alternatively, it is known that, during operation of the turbine at base load conditions, NOx emission levels are reduced when the pilot section operates in a premixed mode. During premix mode operation the natural gas fuel is injected into the pilot section where it mixes intimately with inlet air in the pilot section without combustion. After mixing in the pilot section, the natural gas fuel-air mixture flows into the main burn section where it contacts the hot gases there and combusts and burns. Since the natural gas fuel-air mixture burns at a relatively low temperature, NOx emissions are reduced when compared with operation of the pilot section in the diffusion mode. This reduction in NOx emission levels may be as large as 40%.

Accordingly, to operate the turbine at base load conditions with the pilot section in a premix mode, it is necessary to extinguish the diffusion flame in the pilot section of each combustor, in order to shift from diffusion mode operation to premix mode operation. In order to extinguish the diffusion flame, the flow of the natural gas fuel into the pilot section is reduced until flame-out of the diffusion flame occurs. At this point, since natural gas fuel is independently injected into the main burn section, the main burn section continues to burn fuel there. Following flame-out of the diffusion flame, the flow of natural gas fuel into the pilot section is returned to operational levels and the natural gas fuel mixes with inlet air and flows into the main burn section at a low temperature. During this premix mode operation, the velocity of the natural gas fuel-air mixture in the pilot section is greater than the flame velocity of the flame generated by burning of the natural gas fuel in the main burn section. Therefore, flashback of the flame into the pilot section is prevented and a flame in the pilot section will not be present during premix mode operation.

During periods where it is necessary to operate the turbine at other than base load conditions, the turbine is unloaded by decreasing the flow of natural gas fuel injected into the main burn section to the point of flame-out in that section. However, prior to unloading it is necessary to reestablish a diffusion flame in the pilot section. This is necessary in order to maintain stable operation such that, when it is time to return the turbine to base load operation, there is still a flame in each combustor.

As stated previously, prior to flame-out in the main burn section, a diffusion flame cannot be reestablished in the pilot section using the flame in the main burn section, since the velocity of the natural gas fuel-air mixture in the pilot section is greater than the flame velocity. Also, auto-ignition of the natural gas fuel in the pilot section during premix mode operation is not a possible method of reestablishing a diffusion flame, as the temperature of the inlet air, which is approximately 700° F. (371° C.), is less than the auto-ignition temperature of natural gas fuels, which is greater than 1000° F. (538° C.).

The likelihood of successfully utilizing the two electrical igniters in conjunction with the cross flame tubes, as done during turbine start-up, to reestablish the diffusion flame in the pilot combustor is low. During premix mode operation, where the pressure in each combustor is approximately the same, the feasibility of cross-igniting due to a pressure differential across the cross flame tubes is speculative and therefore unreliable.

In the alternative, the diffusion flame could be reestablished by placing a non-retractable electrical igniter in the pilot section of each combustor. However, this presents a reliability problem in that the igniter may fail to spark. Also, for those gas turbine power plants which employ a number of combustors, the overall operational cost, as well as the chance of failed ignition, increases.

Therefore, there is a need for a system for reestablishing a diffusion flame in the pilot section of a combustor of a gas turbine power plant following operation of the pilot section in a premix mode where natural gas fuel mixes with air without combustion. The present invention provides a system which satisfies this need.

SUMMARY OF THE INVENTION

A method for operating a gas turbine in accordance with the present invention comprises the steps of reducing the flow of natural gas fuel into the pilot section of each combustor until flame-out of the diffusion flame occurs in the pilot section, reinjecting the flow of natural gas fuel into the pilot section, providing inlet air into the recirculation zone of the pilot section through inlet air vents, mixing the natural gas fuel with the inlet air in the recirculation zone prior to entry into the main burn section of the combustor, and injecting a flow of liquid fuel into the pilot section in a manner such that the liquid fuel flows into the recirculation zone. Since the liquid fuel has an auto-ignition temperature which is less than the temperature of the inlet air, the liquid fuel auto-ignites causing the natural gas fuel to burst into flame to reestablish a diffusion flame in the pilot section.

DETAILED DESCRIPTION OF THE PREFERRED EMBODIMENTS

Figure 1:
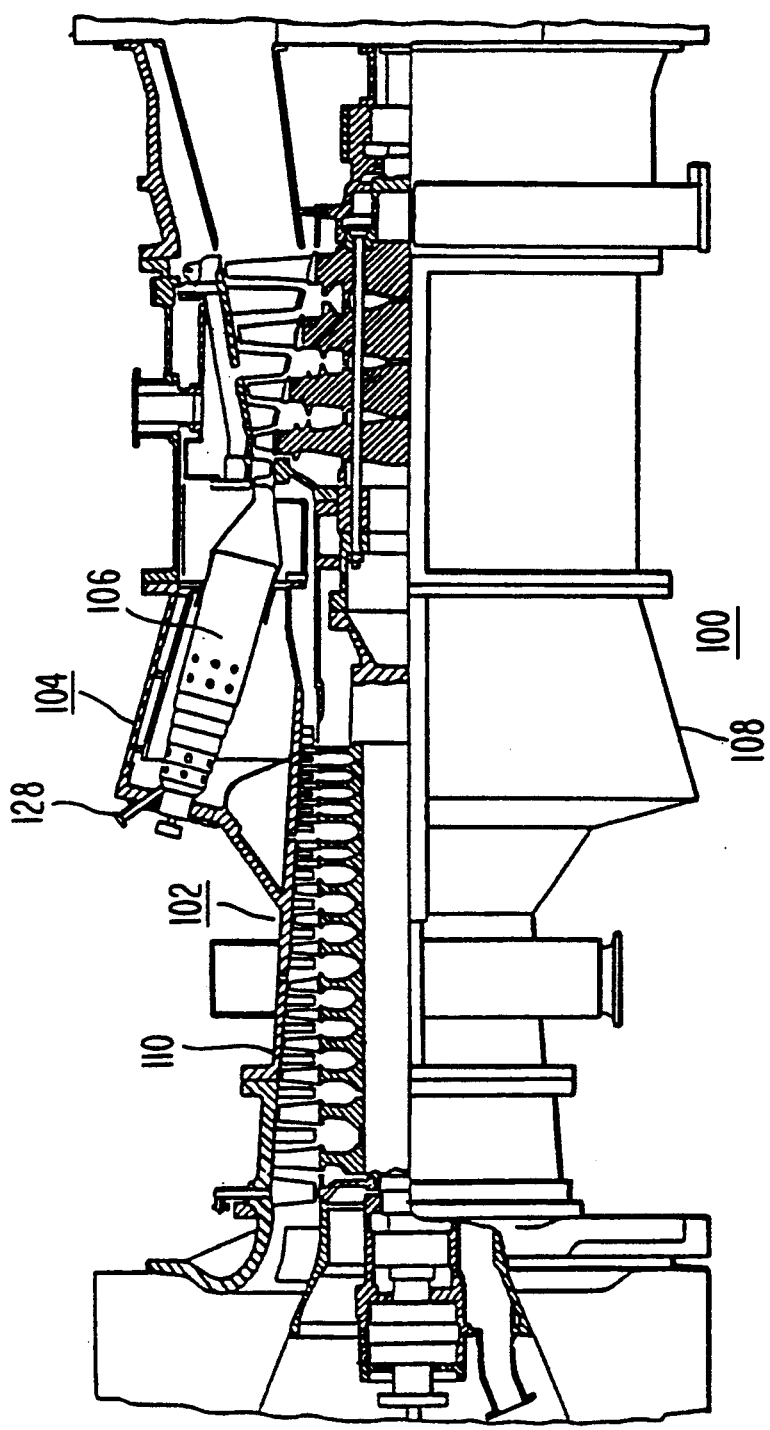
FIG. 1 shows a side elevational view of an industrial gas turbine employed in power plant equipment arranged to operate in accordance with the present invention.

Combustion or gas turbine 100 constructed and arranged in accordance with the present invention is shown in FIG. 1. In the embodiment described herein, gas turbine 100 is preferably the type manufactured by Westinghouse Electric Corporation and is a simple cycle type having a rated speed of 3600 rpm. As will be apparent from the drawing, turbine 100 includes a two bearing single shaft and axial exhaust.

Figure 2:
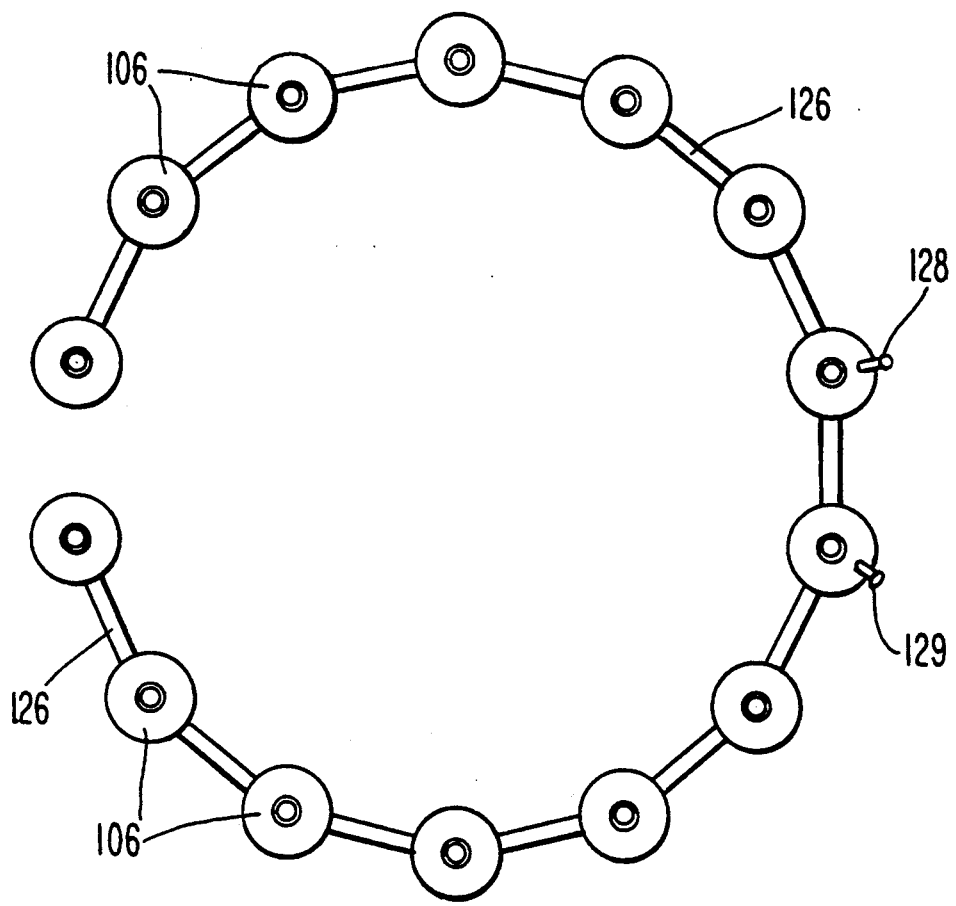
FIG. 2 shows the combustor arrangement employed in the gas turbine of FIG. 1.
Figure 3:
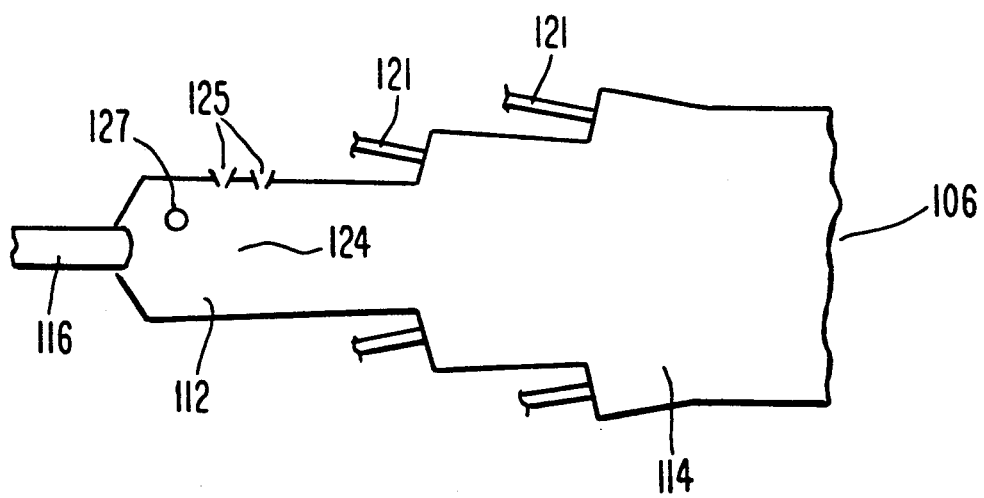
FIG. 3 is a cross-sectional view of a combustor arranged to operate in accordance with the present invention.
Figure 4:
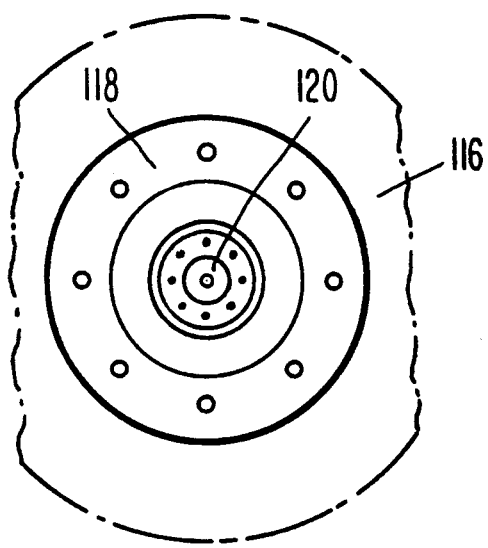
FIG. 4 shows the nozzle arrangement at the upstream end of a combustor shown in FIG. 3.

Referring to FIGS. 1 and 2, pressurized air from compressor 102 is directed into combustion cylinder 104, comprising a total of fourteen can-annular combustors 106 axially mounted within a section 108 of casing 110 about the longitudinal axis of gas turbine 100. As shown in FIG. 3, combustor 106 comprises a pilot section 112 and a main burn section 114, main burn section 114 being downstream and adjacent to pilot section 112. Dual fuel nozzle 116 is mounted at the upstream end of pilot section 112 for providing fuel into pilot section 112. As shown in FIG. 4, nozzle 116 comprises nozzle 118 for injecting natural gas fuel into pilot section 112 and nozzle tip 120 for injecting liquid fuel into pilot section 112.

Figure 5:
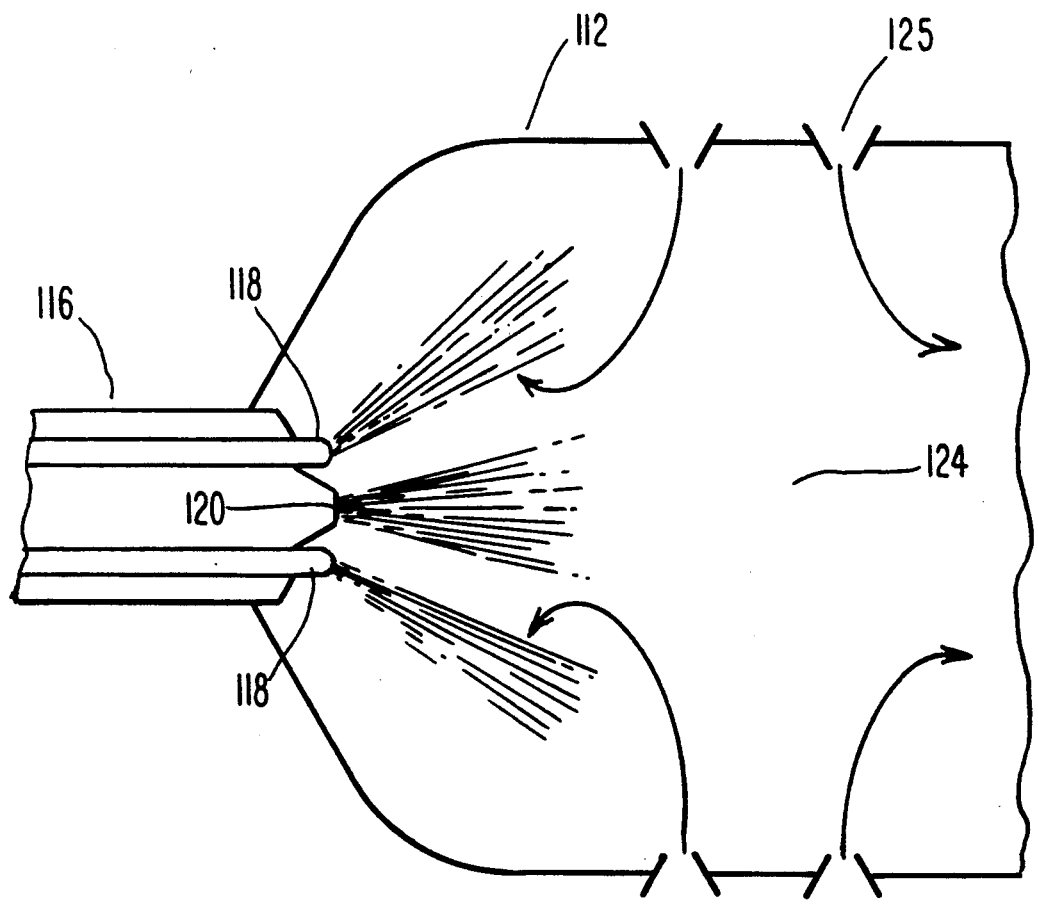
FIG. 5 shows a schematic representation of the operation of the nozzle arrangement shown in FIG. 4.

As shown in FIG. 5, in a preferred embodiment of the present invention, nozzle 120 injects liquid fuel parallel to the longitudinal axis, along the center-line, of combustor 106. Nozzle 120 injects the liquid fuel into recirculation zone 124. Nozzle 118 injects natural gas fuel at an acute angle, ranging from 30 to 60 degrees, in relation to the longitudinal axis of combustor 106.

Referring once again to FIG. 3, natural gas fuel is injected into main burn section 114 by nozzles 121. Inlet air enters recirculation zone 124 of pilot section 112 through fixed-geometry inlet air holes 125.

During turbine start-up conditions, nozzle 118 injects natural gas fuel into pilot section 112 and nozzles 121 inject natural gas fuel into main burn section 114. Igniters 128 and 129, located within pilot section 112 of two of the fourteen combustors 106, are fired, causing combustion of the natural gas fuel in the two associated pilot sections and creation of a diffusion flame at nozzle 116. The hot gas in pilot section 112 flows into the associated main burn section 114 of combustor 106, causing the natural gas fuel injected by nozzles 121 into main burn section 114 to burst into flame and burn. At this point only the two combustors having igniters 128 and 129 are lit.

Referring specifically to FIGS. 2 and 3, for ignition of the remaining non-lit combustors during turbine start-up conditions, combustors 106 are shown to be connected by cross-flame tubes 126, which provide a passage for hot gas into pilot section 112 of each combustor at entry point 127. As pressure builds in the two electrically lit combustors, hot gas from the associated pilot section 112 is forced through cross flame tubes 126. The hot gas enters the neighboring, non-lit combustors at entry point 127 and creates a diffusion flame in pilot section 112 of each combustor 106. Accordingly, the hot gas from the pilot section 112 flows into the main burn section 114, causing combustion of the natural gas fuel in the associated main burn section. At this point, pilot section 112 is said to operate in a diffusion mode and main burn section 114 operates in a lean burn mode.

In order to reduce the level of NOx emissions when turbine 100 reaches base load conditions, operation of pilot section 112 is shifted from the diffusion mode of operation to the premix mode of operation. In order to shift to the premix mode of operation, the natural gas fuel flow through nozzle 118 is reduced until flame-out occurs in pilot section 112 and the diffusion flame at nozzle 118 is extinguished. At this point, the natural gas fuel injected into main burn section 114 by nozzles 121 should, at the least, be held constant to assure proper burning in the aft end of the combustor 106. It is also feasible to increase the flow of natural gas fuel into main burn section 114 by the amount of natural gas fuel that is reduced in pilot section 112.

After the diffusion flame is extinguished in pilot section 112, the flow of natural gas fuel into pilot section 112 through nozzle 118 is increased to begin premix mode operation. The natural gas fuel mixes with inlet air at recirculation zone 124, without combustion due to the absence of a diffusion flame. Upon exiting pilot section 112, the natural gas fuel-air mixture contacts the hot gases generated by the burning of the natural gas fuel in main burn section 114. At this point, the natural gas fuel-air mixture burns in a lean fashion and generates low levels of NOx.

Natural gas fuel, which typically contains 95% methane, along with ethane and propane, as its primary constituents, has an auto-ignition temperature of approximately 1000° F. (538° C.), which is greater than the temperature of the inlet air, approximately 700° F. (371° C.), flowing into recirculation zone 124. Thus, during the premix mode period of operation, the natural gas fuel injected into pilot section 112 will not auto-ignite in that section.

When it is desirable to operate the turbine at other than base load conditions, the flow of natural gas fuel through nozzles 121 into main burn section 114 is reduced to the point of flame-out of the flame in main burn section 114. Prior to reducing the flow of fuel to the main burn section 114, a diffusion flame must be reestablished in pilot section 112, in order to maintain a flame in combustor 106. Accordingly, liquid fuel is injected through nozzle tip 120 into recirculation zone 124 of pilot section 112. Various liquid fuels may be used, such as #2 distillate and commonly known special fuels, with #2 distillate being the preferred liquid fuel. Since the auto-ignition temperature of #2 distillate liquid fuel is approximately 450° F. (232° C.), as the liquid fuel is injected into recirculation zone 124 and contacts the inlet air, having a temperature of approximately 700° F. (371° C.), the liquid fuel ignites causing combustion of the natural gas fuel and the creation of a diffusion flame in pilot section 112. Accordingly, the engine can then be unloaded in the prescribed manner known in the art.

Figure 6:
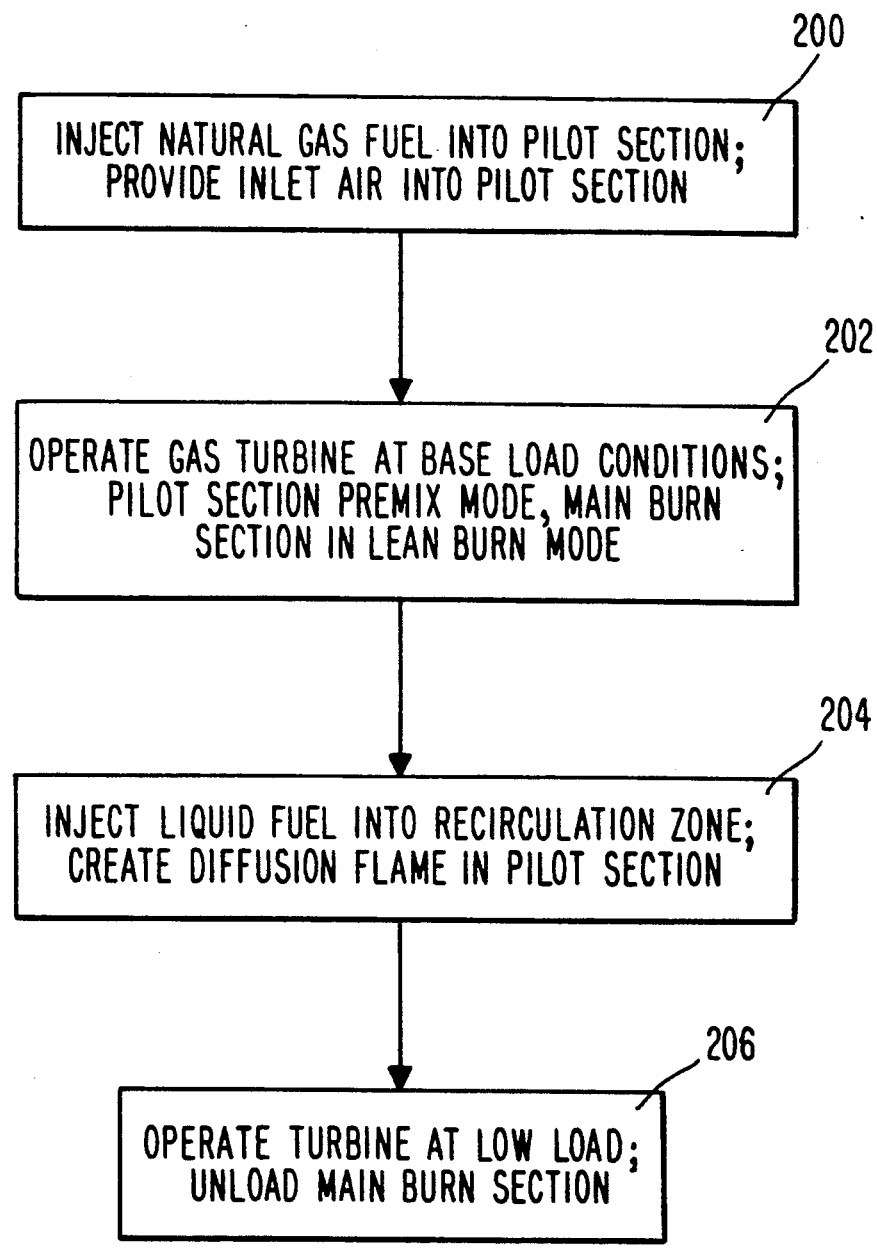
FIG. 6 shows a flow chart of a method in accordance with the present invention.

A method for establishing a diffusion flame in the pilot section of a gas turbine combustor in accordance with the present invention is shown in the flow chart of FIG. 6. Following turbine start-up, and after operation of the pilot section in the diffusion mode has ceased, natural gas fuel is injected into the pilot section at 200, and inlet air is provided in the pilot section. At 202, the pilot section operates in the premix mode where the natural gas fuel mixes with the inlet air, and the main burn section operates in the lean burn mode, such that the gas turbine is operated at base load conditions. Just prior to the end of operation of the gas turbine at base load conditions, liquid fuel is injected into the recirculation zone of the pilot section at 204 and a diffusion flame is created as the liquid fuel auto-ignites upon contacting the inlet air in the recirculation zone. At 206, after the diffusion flame has been created, the main burn section is unloaded such that the turbine operates at low load conditions.

Although particular embodiments of the present invention have been described and illustrated herein, it is recognized that modifications and variations may readily occur to those skilled in the art. Consequently, it is intended that the claims be intended to cover such modifications and equivalents.

We claim:

1. A gas turbine power plant having at least one combustor, said combustor comprising a pilot section and a main burn section, said pilot section comprising a recirculation zone, said main burn section being downstream and adjacent to said pilot section, said gas turbine power plant further having a system for establishing a diffusion flame in said pilot section, said system comprising:

inlet means for providing inlet air into said recirculation zone of said pilot section;
   first nozzle means for injecting a flow of natural gas fuel into said pilot section; and
   second nozzle means for injecting a flow of liquid fuel into said recirculation zone of said pilot section, said liquid fuel having an auto-ignition temperature less than the temperature of said inlet air,
   whereby when said second nozzle means injects a flow of liquid fuel into said recirculation zone of said pilot section, said liquid fuel auto-ignites, causing combustion of said natural gas fuel in said pilot section and creation of said diffusion flame in said pilot section.

2. The system of claim 1, wherein said first and second nozzle means are mechanically joined together in a dual fuel nozzle.

3. The system of claim 2, wherein said second nozzle means injects said flow of said liquid fuel parallel to the longitudinal axis of said combustor.

4. The system of claim 3, wherein said first nozzle means injects said flow of said natural gas fuel at an acute angle in relation to the longitudinal axis of said combustor.

5. The system of claim 4, wherein said acute angle ranges from 30 to 60 degrees.

6. The system of claim 1, wherein said inlet means comprises fixed geometry air vents.

7. The system of claim 1, wherein said natural gas fuel comprises 95% methane, along with ethane and propane as its primary constituents.

8. The system of claim 1, wherein said liquid fuel comprises #2 distillate fuel.

9. In a gas turbine power plant having at least one combustor, said combustor comprising a pilot section and a main burn section, said pilot section, having a recirculation zone and comprising inlet air vents for providing inlet air into said recirculation zone, said main burn section being downstream and adjacent to said pilot section, a method for establishing a diffusion flame in said pilot section, comprising the steps of:

injecting a flow of natural gas fuel into said pilot section;
   providing inlet air into said recirculation zone through said inlet air vents;
   operating said pilot section in a premix mode where said natural gas fuel mixes with said inlet air without combustion in said pilot section; and
   injecting a flow of liquid fuel into said recirculation zone of said pilot section just prior to the end of operation of said pilot section in said premix mode, said liquid fuel having an auto-ignition temperature less than the temperature of said inlet air,
   whereby said liquid fuel is auto-ignited in said recirculation zone and said natural gas fuel bursts into flame to establish said diffusion flame in said pilot section.

10. The method of claim 9, further comprising the step of operating said main burn section in a lean burn mode during operation of said pilot section in said premix mode.

11. The method of claim 10, wherein the mixture of said natural gas fuel and said inlet air flows into and burns in said main burn section during operation of said pilot section in said premix mode.

* * * * *